United States Patent
Galluch

(10) Patent No.: US 8,424,700 B2
(45) Date of Patent: Apr. 23, 2013

(54) METHOD AND PACKAGING FOR BAKED, THAW AND SERVE, OR MICROWAVABLE GOODS

(75) Inventor: Noel F. Galluch, Boston, NY (US)

(73) Assignee: Rich Products Corporation, Buffalo, NY (US)

( * ) Notice: Subject to any disclaimer, the term of this patent is extended or adjusted under 35 U.S.C. 154(b) by 1888 days.

(21) Appl. No.: 11/557,678

(22) Filed: Nov. 8, 2006

(65) Prior Publication Data

US 2007/0108089 A1   May 17, 2007

Related U.S. Application Data

(60) Provisional application No. 60/737,138, filed on Nov. 16, 2005, provisional application No. 60/798,422, filed on May 5, 2006.

(51) Int. Cl.
| | | |
|---|---|---|
| *B29D 22/00* | (2006.01) | |
| *B65D 21/00* | (2006.01) | |
| *B65D 21/024* | (2006.01) | |
| *B65D 21/032* | (2006.01) | |

(52) U.S. Cl.
USPC ......... 220/23.4; 206/504; 206/820; 220/23.2; 249/117; 249/119; 249/120; 428/34.1

(58) Field of Classification Search .................. 428/34.1; 220/23.4, 23.2; 249/119, 120, 117; 206/504, 206/820
See application file for complete search history.

(56) References Cited

U.S. PATENT DOCUMENTS

| | | | |
|---|---|---|---|
| 3,228,518 A | 1/1966 | Coby | |
| 3,654,746 A | 4/1972 | Beckers | |
| 4,002,773 A | 1/1977 | Entenmann | |
| 4,522,301 A | 6/1985 | Ajmera | |
| 4,923,701 A | 5/1990 | VanErden | |
| 4,986,432 A * | 1/1991 | Anghileri | 220/23.4 |
| 5,547,694 A | 8/1996 | Perry et al. | |
| 5,632,924 A | 5/1997 | Gics et al. | |
| 6,869,059 B2 | 3/2005 | Sloan et al. | |
| 2004/0089162 A1 | 5/2004 | Lorence et al. | |
| 2004/0262301 A1* | 12/2004 | Young et al. | 219/731 |

FOREIGN PATENT DOCUMENTS

| | | |
|---|---|---|
| DE | 20211821 U1 | 1/2003 |
| GB | 2251599 A | 7/1992 |
| GB | 2371210 A | 7/2002 |
| JP | 2002-293328 A | 10/2002 |

OTHER PUBLICATIONS

Translation of JP 2002-293328, Furomoto et al. (Oct. 9, 2002).*

* cited by examiner

*Primary Examiner* — Brent O'Hern
(74) *Attorney, Agent, or Firm* — Fay Sharpe LLP

(57) ABSTRACT

Packaging for heatable food portions comprises an ovenable tray including a plurality of serving containers connected by a detachable support matrix. In one embodiment, the support matrix is attached to the serving containers by hot melt glue which melts during baking or heating to automatically release the support matrix from the serving containers. Pre-filled trays are shipped with display covers fitted to the serving containers, such that the covers may be placed on the individual serving containers after the food portions are baked and the serving containers are separated from the support matrix to provide individually packaged, freshly baked food portions for display.

4 Claims, 6 Drawing Sheets

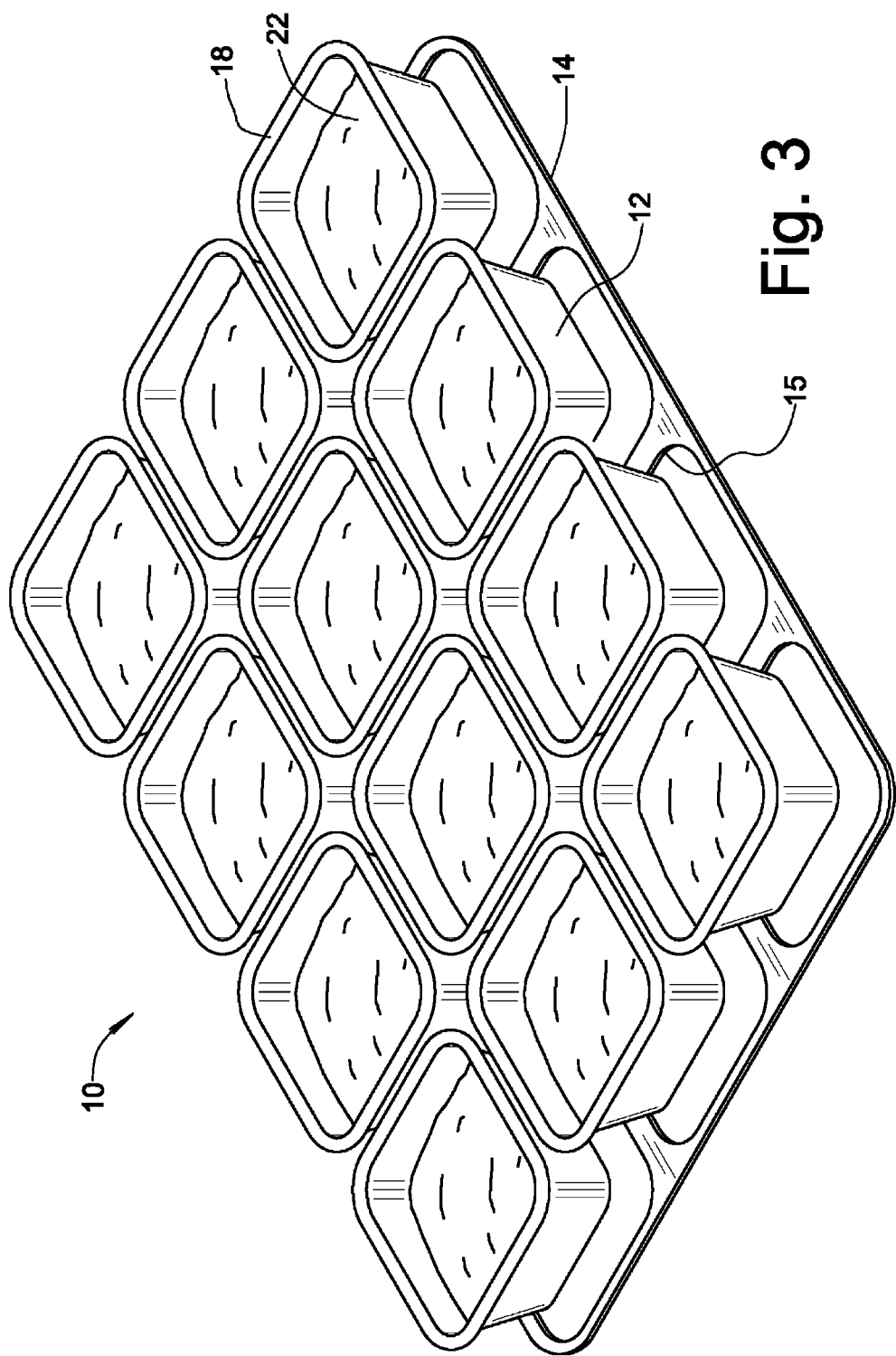

METHOD AND PACKAGING FOR BAKED, THAW AND SERVE, OR MICROWAVABLE GOODS

CROSS-REFERENCE TO RELATED APPLICATIONS

The present application claims benefit of U.S. Provisional Patent Application Ser. No. 60/737,138 filed Nov. 16, 2005 and U.S. Provisional Patent Application Ser. No. 60/798,422 filed May 5, 2006, the entire disclosures of which are hereby incorporated herein by reference.

FIELD OF THE INVENTION

The present invention pertains generally to packaging for frozen food items and specifically to packaging for frozen dough or batter based products suitable for shipping to a bakery or restaurant where the product is prepared, displayed and sold to the end user in the same packaging.

BACKGROUND OF THE INVENTION

It is known to manufacture frozen dough or batter based products such as brownies, cakes, flan, quiche, muffins, sweet rolls, pastries, cobblers, or the like and then freeze and bulk pack the products for shipping to a bakery, restaurant, or convenience store. The product is typically unpacked and each unit of product is individually placed on a baking pan with a suitable pan liner. Next, the product is placed in a retarder or is floor thawed. The product may also be proofed prior to baking. After baking, the product is allowed to cool and then it may be iced or topped with sugar. Finally, the product is removed from the pan and placed into packaging for display and sale to the customer.

U.S. Pat. No. 4,986,432 assigned to Novacart S.P.A. of Italy discloses a baking tray comprising a support element 2 made of a laminar paper material having a plurality of holes 3 for receiving a plurality of pleated paper cups 4. The support element includes perforations 5 for separating individual cups or groups of cups. The pleated paper cups may be attached to the support element by gluing the top rim of the cup to the support element or by folding top rim of the cup such that it catches the support element. The disclosed baking tray is helpful to some extent, but it is not suitable for pre-filling with dough or batter by an automated filler and conveying into stacked arrangement in a shipping container because the paper cups and support element are not strong enough to withstand a high speed line and spiral freezer according to current practice. Another drawback is that the end product after backing is not adapted to be readily covered as a unit portion for display and sale to a customer.

What is needed is improved packaging and methodology that further reduces the labor required by the bakery, restaurant, or store.

SUMMARY OF THE INVENTION

The present invention is generally embodied by a bakeable tray that comprises a plurality of serving containers and a support matrix attached to the plurality of serving containers, wherein the support matrix is detachable from the plurality of serving containers. In various embodiments of the tray, each of the plurality of serving containers includes an open top and a flange adjacent the open top. In one such embodiment, the support matrix is attached by hot melt adhesive to an underside of each serving container flange, such that the support matrix drops down and away from the flanges during baking. In another such embodiment, the support matrix is attached by non-hot melt adhesive to an underside of each serving container flange, and the support matrix is perforated to allow manual detachment of the support matrix after baking. In still another such embodiment, the support matrix includes a plurality of slots about each container for receiving a portion of the flange.

The invention is further embodied by a food package comprising a bakeable tray that includes a plurality of serving containers and a support matrix attached to the plurality of serving containers, wherein the support matrix is detachable from the plurality of serving containers, and a plurality of food portions each received in a respective one of the plurality of serving containers, whereby the tray and plurality of food portions may be loaded as a unit into a cooking appliance and the support matrix detached from the plurality of serving containers after such loading to provide a plurality of separate serving containers each containing prepared food. The invention is also embodied by a food package comprising at least one pre-filled bakeable tray that includes a plurality of serving containers, a support matrix detachably joined to the plurality of serving containers, and a plurality of food portions each received in a respective one of the plurality of serving containers; a plurality of covers adapted to fit on the serving containers; and a shipping container enclosing the pre-filled tray or trays and the covers.

Finally, the invention is embodied by a method of preparing individually packaged food items for display to purchasers comprising the steps of: opening a shipping container enclosing a plurality of covers and a bakeable tray that includes a plurality of serving containers pre-filled with respective food portions and a support matrix detachably joined to the plurality of serving containers, wherein the plurality of covers are adapted to fit over the plurality of serving containers; removing the plurality of covers and the tray; heating the tray in a cooking appliance; separating the support matrix from the plurality of containers; and placing the plurality of covers onto the plurality of serving containers. In a particular embodiment, the step of separating the support matrix from the plurality of containers occurs automatically during the step of heating the tray in a cooking appliance because the support matrix is attached to the serving containers by hot-melt adhesive.

BRIEF DESCRIPTION OF THE DRAWINGS

The nature and mode of operation of the present invention will now be more fully described in the following detailed description of the invention taken with the accompanying drawing figures, in which:

FIG. 3 is a view similar to that of FIG. 1, however the baking tray is shown after a support matrix thereof has dropped down during baking;

DETAILED DESCRIPTION OF THE INVENTION

The present invention provides a shippable packaging solution for portioned food products—for example frozen dough or frozen batter portions for baking and pre-baked dough or batter portions for warming—that substantially reduces the labor involved in preparing the portions for display and sale at a sale location such as a quick service restaurant, bakery, convenience store, or other outlet. The invention is embodied by packaging apparatus and reduced-labor methods based on the packaging apparatus for preparing food portions for display and sale.

Figure 1:
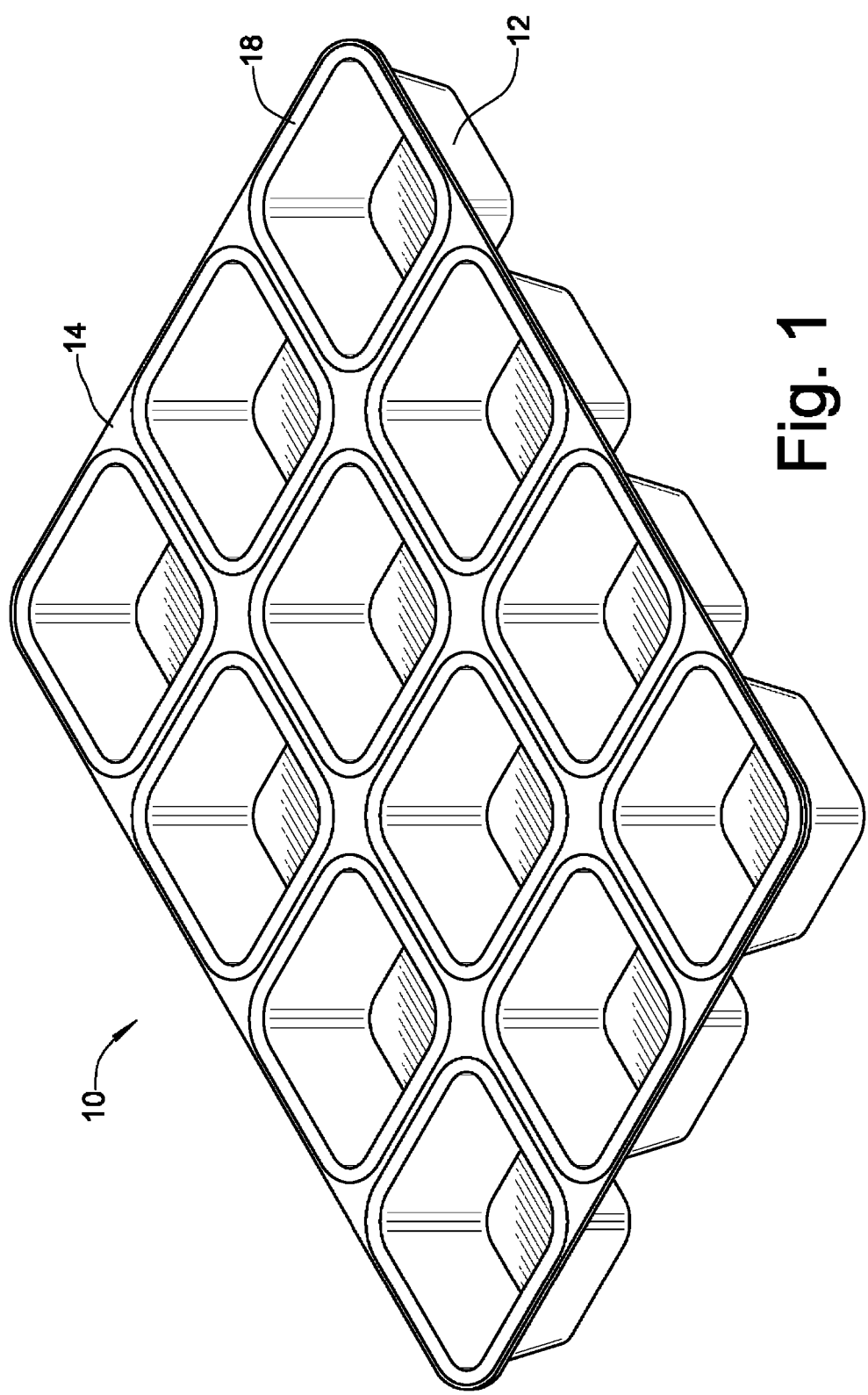
FIG. 1 is an isometric view of a baking tray formed in accordance with an embodiment of the present invention, wherein the baking tray is shown prior to filling.
Figure 2:
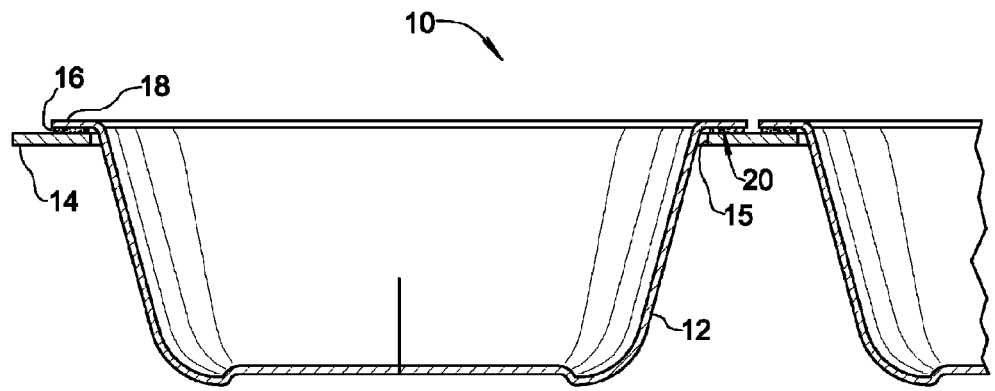
FIG. 2 is a cross-sectional view of a portion of the baking tray shown in FIG. 1.

Reference is made to FIGS. 1-3, wherein a tray 10 formed in accordance with an embodiment of the invention is shown as comprising a plurality of serving containers 12 and a support matrix 14 attached to the serving containers 12. Tray 10 is designed to withstand baking in an oven (conventional or microwave), and thus serving containers 12 and support matrix 14 are manufactured from a suitable bakeable material. A preferred bakeable material is bakeable paper board, however those skilled in the art will understand that other ovenable materials may be used, including without limitation plastics, corrugates, and glaceen. These materials are further suitable as frozen food packaging materials such that trays 10 can be manipulated by food processing equipment, high-speed conveyor lines, and spiral freezers without being damaged.

In accordance with the present invention, support matrix 14 is detachable from the plurality of serving containers 12 or is perforated to enable the serving containers to be separated from one another. In the embodiment depicted in FIGS. 1-3, support matrix 14 is attached to serving containers 12 by hot melt adhesive 16 chosen to melt at a temperature preferably within a range of 250° F.-275° F. (121° C.-135° C.). Some adhesives that are suitable are LOCTITE brands HYSOL 3× item #83368, HYSOL SUPERPAC item #83404, and HYSOL QUIKPAC item #83399, available from Henkel Corp. in Rocky Hill, Conn. As will be appreciated, hot melt adhesive 16 melts during baking or heating when it reaches a predetermined temperature, thereby causing support matrix 14 to detach from serving containers 12. In an advantageous arrangement, serving containers 12 each include an open top surrounded by an outwardly extending flange 18 adjacent to the open top, and support matrix 14 is attached by hot melt adhesive 16 to an underside 20 of each flange 18. This arrangement is advantageous because support matrix 14 will drop down from flanges 18 under gravity when hot melt adhesive 16 melts during baking or heating, as illustrated in FIG. 3. In this way, serving containers 12 are automatically separated from one another during baking or heating. As best seen in FIG. 3, support matrix 14 includes a plurality of container-receiving openings 15 in which serving containers 12 are received. As illustrated in FIG. 3, the surface of support matrix 14 is continuous between each opening 15.

Figure 4:
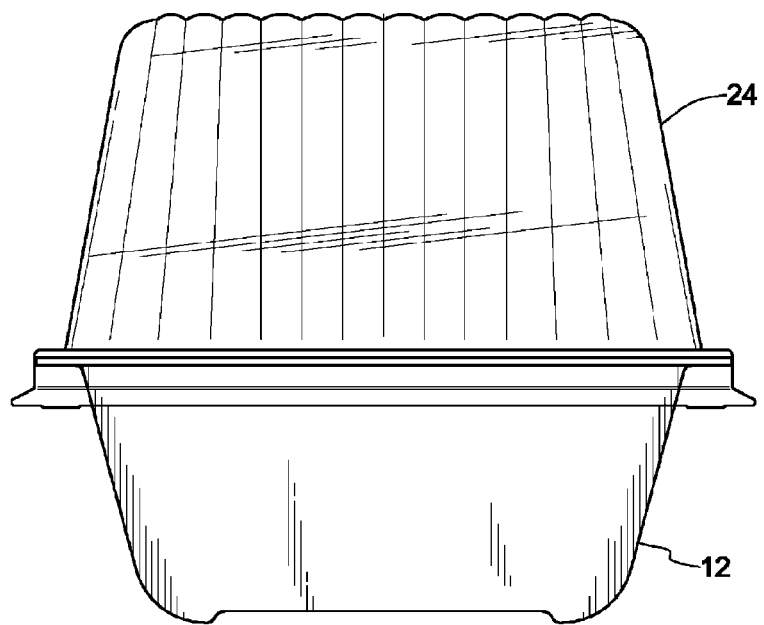
FIG. 4 is a side elevational view of a serving container of the baking tray shown with an attached cover.

Attention is now directed to FIG. 4. Each of the individual serving containers 12 may be covered by a transparent plastic cover 24 to provide individually packaged, freshly baked or heated food portions ready for display in a display case or the like. Covers 24 are preferably sized to snap it onto serving containers 12 in a manner known to those skilled in the art. Suitable cover materials include polyethylene (PET) and styrene, however other materials may be used without straying from the invention. The shape of serving containers 12 and covers 24 is not critical and may depend upon the type of food being packaged, so long as the covers 24 fit the serving containers 12.

Figure 8:
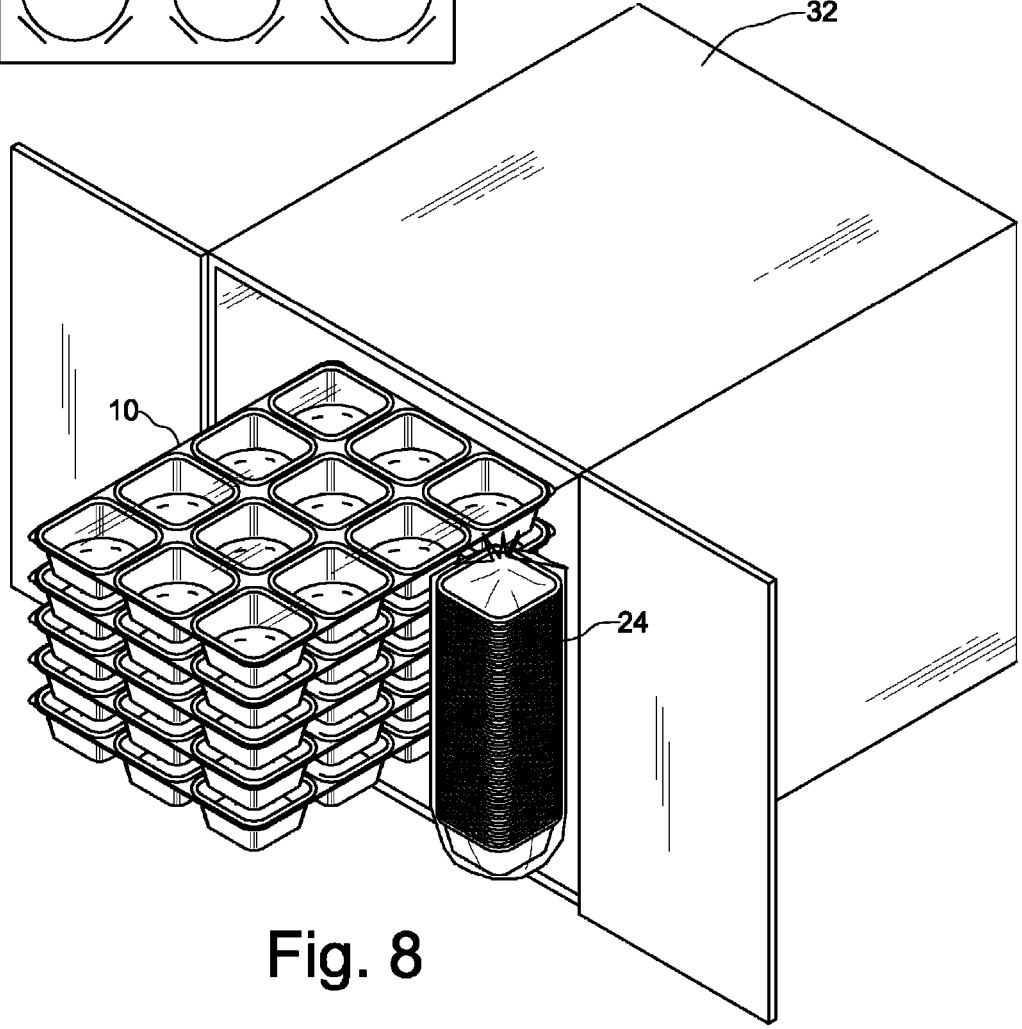
FIG. 8 is an isometric view showing a shippable food package formed in accordance with an embodiment of the present invention.

In accordance with the present invention, serving containers 12 of tray 10 may be pre-filled with respective food portions 22 prior to delivery to a restaurant, bakery, convenience store, or other sales outlet. Food portions 22 may be frozen dough, frozen batter, baked dough, baked batter, or other types of food items. In an embodiment of the invention shown in FIG. 8, a plurality of pre-filled trays 10 are stacked and enclosed in a shipping container 32 along with a stack of covers 24. Shipping container 32 is depicted as being a cardboard box, however it may be a plastic bag or other container suitable for transport. Each tray 10 is preferably sealed by a sheet of shrink-wrapped plastic to protect food portions 22 from foreign matter.

Figure 5:
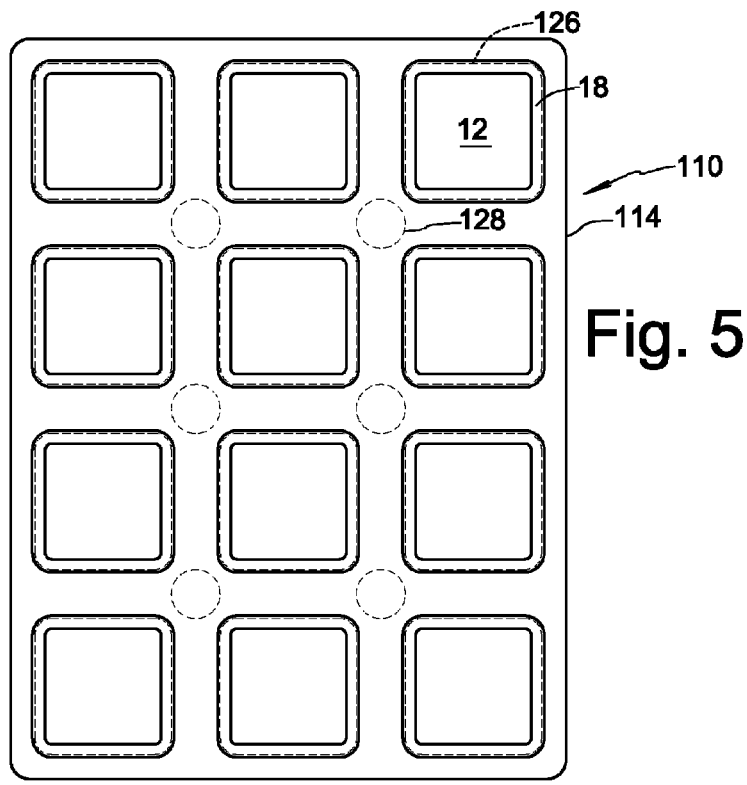
FIG. 5 is a top plan view of a baking tray formed in accordance with another embodiment of the present invention.

FIG. 5 illustrates a tray 110 formed in accordance with an alternative embodiment of the present invention. Tray 110 is similar to tray 10 of FIGS. 1-3, except that tray 110 has a support matrix 114 that is attached to serving containers 12 by a non-hot melt adhesive that is chosen so it does not melt during normal baking or heating, and support matrix 114 includes perforations 126 beneath each flange 18 forming an outline perforation about the serving container, and perforations 128 near perforations 126 forming punch-out holes, whereby a user may punch a hole through support matrix 114 to permit better finger access for separating serving containers 12 from support matrix 114 using perforations 126. In this way, support matrix 114 may be manually detached from serving containers 12. As will be understood, a small peripheral ring of the original support matrix 114 will be left glued to the underside of each flange 18, thereby strengthening each flange 18 in an advantageous manner.

Figure 6:
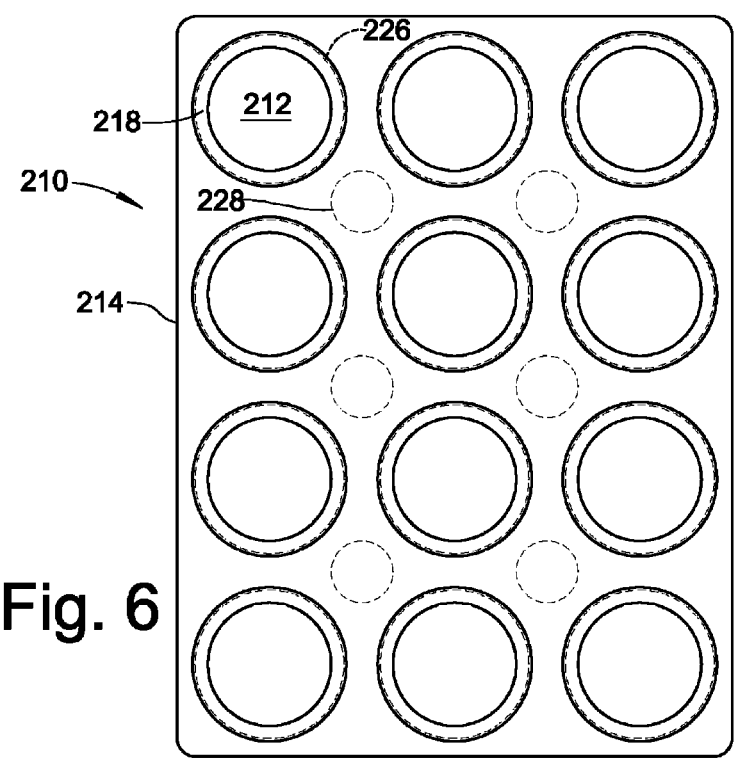
FIG. 6 is a top plan view of a baking tray formed in accordance with yet another embodiment of the present invention.

FIG. 6 shows a tray 210 according to another embodiment. Tray 210 is similar to tray 110 of FIG. 5, except that it includes serving containers 212 having a circular shape instead of a rectangular shape, and the containers 212 are outlined by respective circular perforations 226 in support matrix 214. The circular open top of each container 212 is bordered by a circumferential flange 218, and the associated perforation 226 is slightly offset from an outer edge of flange 218 just beneath the flange. Punch-out hole perforations 228 are provided near outline perforations 226 similar to the embodiment of FIG. 5. As in the embodiment of FIG. 5, a small peripheral ring of the original support matrix 214 will be left glued to the underside of each flange 218 after the support matrix is detached, thereby strengthening each flange 218.

Figure 7:
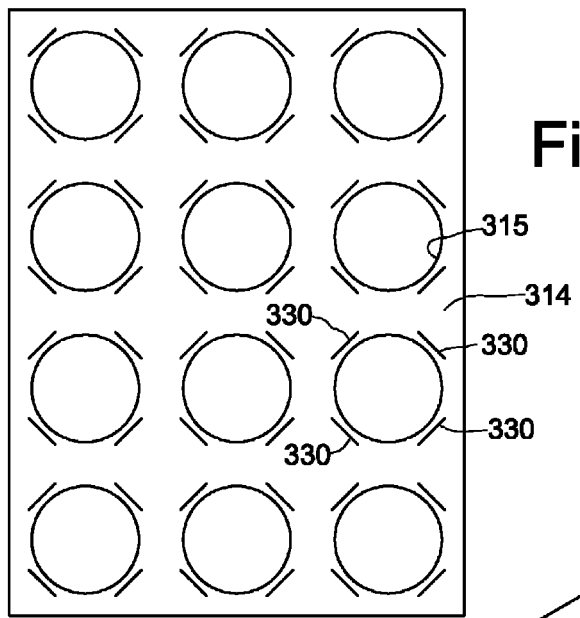
FIG. 7 is a top plan view of a support matrix of a baking tray formed in accordance with a further embodiment of the present invention.

While the embodiments previously described herein use adhesive to attach a support matrix to a plurality of serving containers, it is also possible to use other means of attachment. FIG. 7 shows a support matrix 314 including a plurality of container receiving openings 315 each surrounded by a plurality of slots 330 arranged to receive portions of the flange of a respective serving container to attach the support matrix 314 to serving containers.

Figure 9:
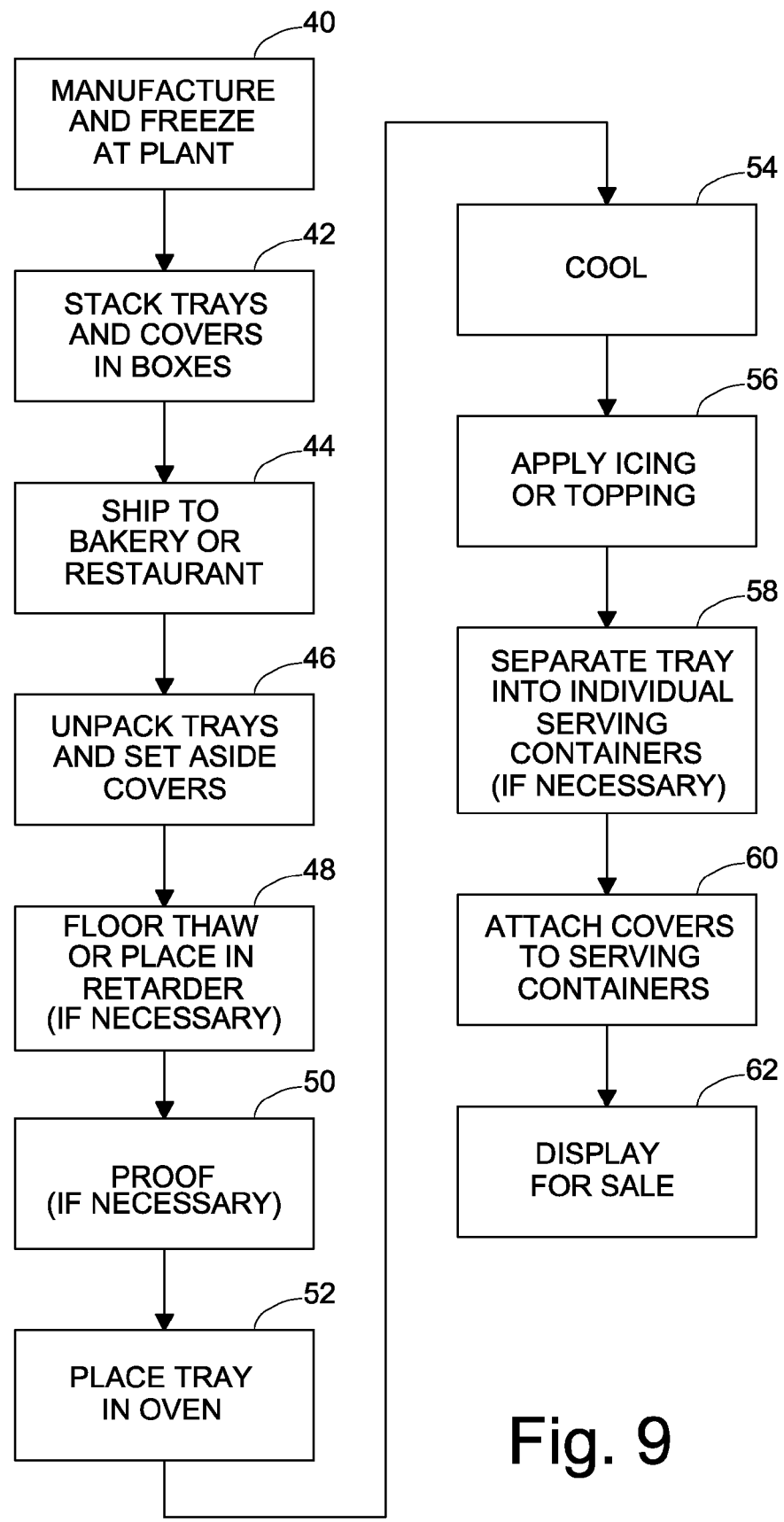
FIG. 9 is a flow chart illustrating a method in accordance with an embodiment of the present invention.

FIG. 9 is a flow diagram, part of which shows a preliminary manufacturing and shipping steps and part of which shows a method of the present invention by which individually packaged food items, especially dough- or batter-based food products such as brownies, cakes, flan, quiche, muffins, sweet rolls, pastries, cobblers, or the like, are prepared for display to purchasers. The method is based on the packaging solutions described above, and involves substantially less time, skill, and effort than prior art methods. Preliminary steps include filling trays 10 with food portions 22 and freezing the pre-filled trays at the plant as indicated in block 40, and packaging a stack of trays 10 and a stack of covers 24 into a shipping container 32 as indicated in block 42. These preliminary steps may be performed by automated food processing equipment, for example by placing unfilled trays 10 on a high-speed conveyor that passes through a filler machine programmed to deposit food portions 22 into serving containers 12 and then delivers the pre-filled trays to a freezer such as a spiral freezer. The shipping container 32 enclosing pre-filled trays 10 and covers 24 is then delivered to a specified destination, such as a quick serve restaurant, bakery, or convenience store in accordance with block 44, where it may be stored in a freezer until needed.

Blocks 46 through 62 of FIG. 9 illustrate a method for freshly preparing and displaying individually packaged food items in accordance with an embodiment of the present invention. First, in block 46, the shipping container 32 is opened and unpacked, and the covers 24 set aside for use in a later step. Then, in block 48, the trays 10 are floor thawed or placed in a retarder, if necessary. After thawing, trays 10 may be proofed if proofing is required for the particular food portions 22, as indicated by block 50. If proofing is required, it is advisable to use a packaging embodiment that does not use hot melt adhesive, otherwise the adhesive will melt prematurely during proofing. Next, in block 52, trays 10 are placed in a cooking appliance such as a conventional oven or a microwave oven for a predetermined time and at a predetermined oven setting in order to freshly bake or heat food portions 22.

Following baking or heating, serving containers 12 are removed from the cooking appliance and allowed to cool in accordance with block 54. If hot melt adhesive was used for attachment, then the support matrix has already detached from the serving containers 12 and the serving containers 12 are removed individually (the detached support matrix 14 may be discarded or recycled); otherwise, the serving containers 12 may be removed as part of trays 10. If the food portions are of a type that is topped with icing, frosting, or other topping, then the topping is applied in block 56. If necessary, the trays 10 are separated into individual serving containers pursuant to block 58 and a cover 24 is attached to each serving container 12 pursuant to block 60. Finally, the individually packaged, freshly prepared food portions are placed in a display for sale to customers according to block 62.

As will be appreciated, the preparation steps may be performed by an employee without ever touching food portions 22, thereby reducing the risk of contamination. Moreover, the step of placing food portions onto an in-house baking tray is completely eliminated, thereby saving time and removing the need to clean and store baking trays. The present invention thus provides an advantageous "cradle to grave" approach to food packaging and preparation that yields real economic benefit to those who freshly prepare baked goods and other food items on-site for sale to the public.

What is claimed is:

1. A bakeable tray for baking food products comprising a plurality of serving containers and a support matrix attached to the plurality of serving containers, wherein the support matrix is detachable from the plurality of serving containers and the support matrix includes a plurality of openings for receiving the containers, wherein each of the plurality of serving containers includes an open top and a flange adjacent the open top, and the support matrix is attached by hot melt adhesive to an underside of each serving container flange, wherein the hot melt adhesive melts at a temperature within a range of 250° F.-275° F. (121° C.-135° C.), whereby the support matrix detaches from the plurality of serving containers during baking at a temperature at or above the melting temperature of the hot melt adhesive because the hot melt adhesive melts and gravity causes the support matrix to drop down.

2. The tray according to claim 1, wherein the support matrix is without perforations between each of the openings.

3. A bakeable tray for baking food products comprising a plurality of serving containers and a support matrix attached to the plurality of serving containers, wherein the support matrix is detachable from the plurality of serving containers, wherein the adhesive is a non-hot melt adhesive and the support matrix is perforated to enable the support matrix to be detached from the plurality of serving containers, wherein each of the plurality of serving containers includes an open top and a flange adjacent the open top, the support matrix is attached by the non-hot melt adhesive to an underside of each serving container flange, and the support matrix is perforated beneath each serving container flange to form a perforated outline about the corresponding serving container.

4. The tray according to claim 3, wherein the support matrix is perforated to provide a plurality of punch-out openings allowing improved finger access to the perforated outlines about the plurality of serving containers.

* * * * *